United States Patent Office 3,379,286
Patented Apr. 23, 1968

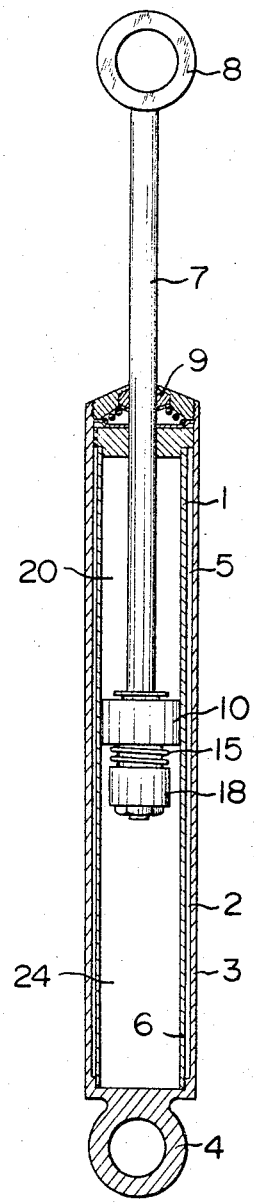
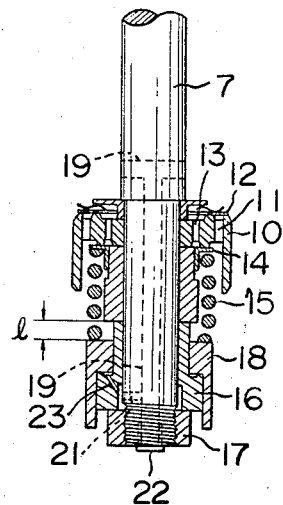
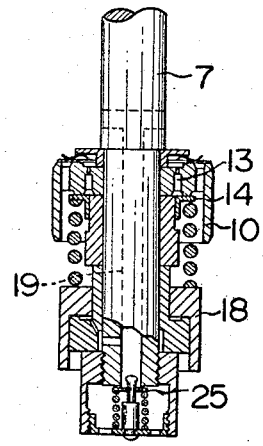

3,379,286
OIL DAMPER
Tatsuya Takagi, 6–10 Araebisu-machi,
Nishinomiya-shi, Japan
Filed June 14, 1966, Ser. No. 557,519
Claims priority, application Japan, Mar. 30, 1966,
41/19,292
8 Claims. (Cl. 188—88)

ABSTRACT OF THE DISCLOSURE

An oil damper particularly for damping shocks which are apt to be transmitted from the ground through the wheels of a vehicle includes a piston rod having a piston which is slidable in a double-walled cylinder and which is adapted to be pivoted at one end to a moving part. A press piston is carried at the inner end of the piston rod beyond the piston and a floating cylinder is disposed with a skirt portion around the press piston and it is slidable between the press piston and the piston. The piston includes a passage which is closed by a valve under the biasing force of a spring carried between the valve and the floating cylinder. A feature of the construction is that when the piston is moved some oil ahead of the piston is bypassed through a passage defined in the piston and covered by the valve. In addition, additional fluid is passed through a bore of the piston and under increased pressure it causes the lifting up of the floating cylinder in a direction away from the press piston to cause the biasing spring acting on the valve to exert an increased closing pressure thereon.

Summary of the invention

This invention relates in general to fluid dampers or shock absorbers and provides improvements in and relating to an oil damper mostly used for motor vehicles.

When a motor vehicle is driven on a good road, an oil damper of not so large a damping force had better be used, for such an oil damper transmits little shocks from the ground, thereby increasing riding comfort to passengers.

However, when a motor vehicle equipped with such an oil damper is driven on a bad road, the vehicle will sway and jolt violently, making it impossible to continue driving.

An oil damper mounted between the wheels and the car body is required to apply a proper damping force to a car body having a natural vibration of relatively low frequency (60 to 90 cycles/minute) as well as to wheels having a natural vibration of relatively high frequency (600 to 800 cycles/minute). An oil damper of the conventional type is unable to cope with changes in frequency of vibration; it is designed merely to operate in proportion to the speed of piston. If such an oil damper is designed such that it develops a proper damping force at lower piston speeds when the frequency of vibration is low, this oil damper will develop an excessively large damping force at higher piston speeds when the frequency of vibration is high, so that the car body will be subjected to harmful shocks.

An oil damper according to this invention obviates the disadvantage of oil dampers of prior art as described hereinabove by providing means whereby the damping force of an oil damper, which is relatively small to meet the requirements of checking the natural vibration of wheels, can automatically be increased so as to check the natural vibration of a car body which generally has a low frequency.

When an oil damper is subjected to a movement of high frequency originating from the surface of a road, there occurs an impact at the initial stage of development of a damping force.

A first embodiment of this invention is adapted to absorb this initial impact. A second embodiment, which is also adapted to absorb this initial impact, has as its principal object the provision of means whereby a damping force can be adjusted so that the damping force may be increased when vibrations of lower frequency are to be checked and reduced when vibrations of higher frequency are to be checked.

A third embodiment represents an improvement over the second embodiment. When an oil damper incorporating the principles of this invention has a substantially smaller damping force than an oil damper of the conventional type, the natural frequency of wheels may be checked insufficiently, with the result that the wheels and a suspension system therefor may move too violently or the wheels may be prevented from maintaining contact with the ground in an appropriate manner on a bad road. The third embodiment obviates this disadvantage by providing restriction to part of an oil flow to increase the damping force developed by the oil damper in a region of piston speeds above a certain amplitude of vibration of higher frequency.

The invention will now be explained with reference to the accompanying drawings wherein:

FIG. 1 is an elevation of an oil damper incorporating the principles of this invention;

FIG. 2 is a central fragmentary longitudinal sectional view of an oil damper of FIG. 1, showing a piston portion representing features of this invention;

FIG. 3 is a view similar to FIG. 2 but showing a modified form of an oil damper also incorporating the principles of this invention.

Figure 4:
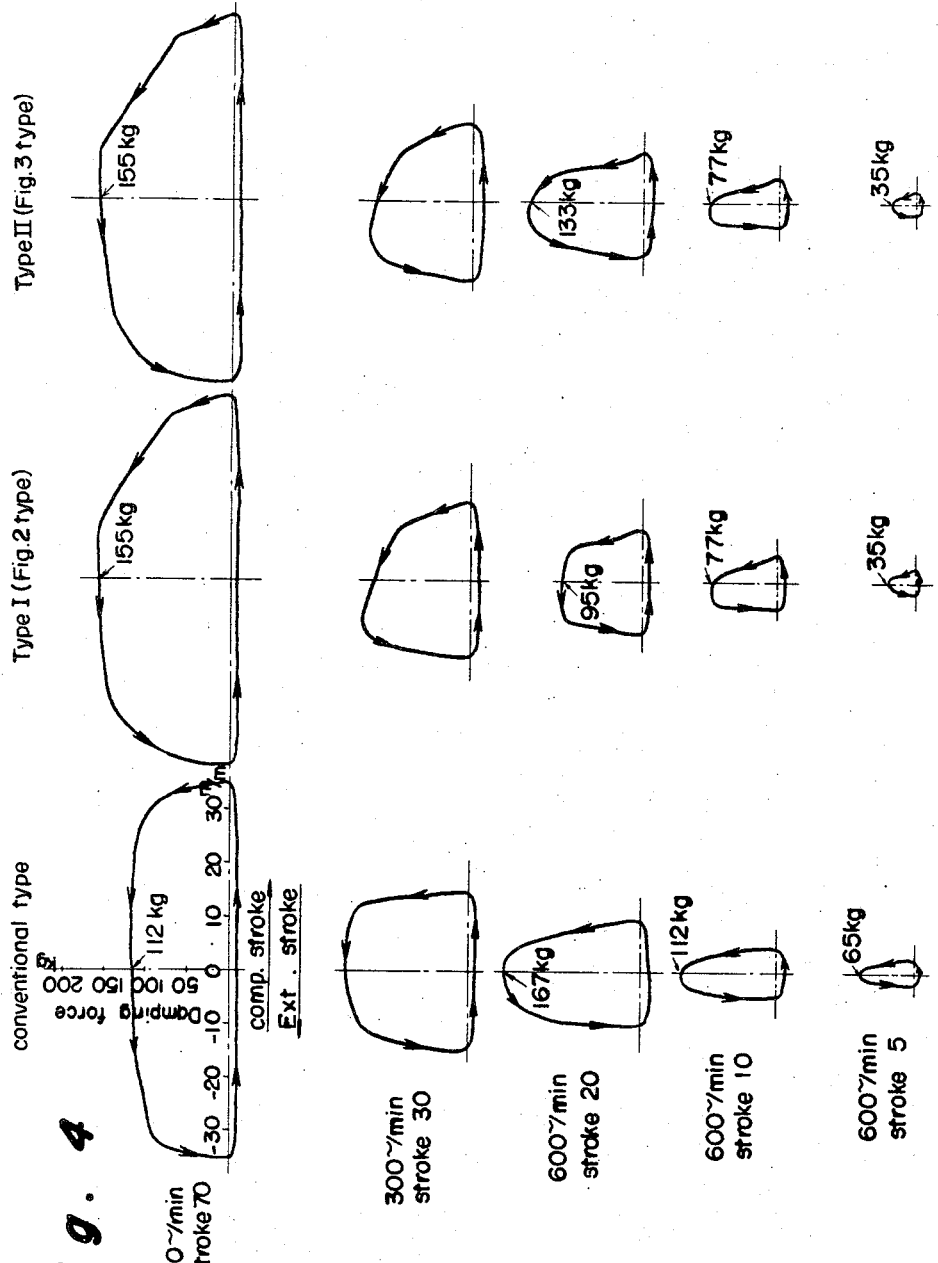
FIG. 4 shows diagrams comparing the damping force characteristics of different forms of an oil damper according to this invention with the damping force characteristics of an oil damper of prior art.

Referring to the drawings in particular the invention embodied therein, FIGURES 1 and 2 includes an oil damper having a cylinder 1 inserted in an outer cylinder 3, with a space 2 being provided between the two cylinders. Said outer cylinder 3 has at a lower end thereof a mounting portion 4 for securing the damper to an axle of a vehicle. An air chamber 5 is provided at an upper part of said space 2 to permit a piston 10 to move in reciprocating motion in the cylinder 1. A small hole 6 is formed near the bottom of the inner wall 1 to permit oil to pass therethrough. A piston rod 7 carrying the piston 10 has at the top thereof a mounting portion 8 for securing the damper to a chassis. An oil seal 9 circumscribes piston rod 7. The piston 10 is provided with a passage 11 to permit oil to pass therethrough. A one-way valve 12 (FIG. 2) permitting oil to move only in an upward direction is mounted in the passage 11. Piston 10 is provided with another passage 13 to permit oil to pass therethrough which has a pressure valve 14 mounted therein which permits oil to move only in a downward direction. A valve spring 15 biases valve 14 to an upward closed position. The structural arrangement described above is similar to the structural arrangement used in many oil dampers of prior art.

Piston rod 7 extends through piston 10 and has a pressing piston 16 secured to the front end thereof by a nut 17. A floating cylinder 18 is loosely fitted over said pressing piston 16. A lower end of said valve spring 15 rests on an upper end of said floating cylinder 18 and urges it downwardly against the pressing piston 16. Piston rod 7, which has an oil passage 19 formed in the center thereof, has a transverse passage 21 to permit oil in an upper oil chamber 20 passing through the passages 19 and 21 to act on floating cylinder 18. The oil passage 19 is closed at a lower end thereof by a plug 22. Pressing piston 16 has an oil passage 23 maintaining communication with the transverse passage 21, which permits oil to move to floating cylinder 18.

It is to be noted that the effective pressing area of floating cylinder 18 is larger than the effective pressing area of pressure valve 14, and that oil passage 23 is a small hole having a throttling effect.

The operation of the invention will now be explained. In the first embodiment, when piston 10 is subjected to an external force to extend the same, one-way valve 12 is closed and oil in the upper oil chamber 20 flows into floating cylinder 18 to push valve spring 15 upward, so that an initial impact can be relieved. It is only after floating cylinder 18 is filled with oil that pressure valve 14 is opened.

In the second embodiment, an external force applied to the damper to extend piston 10 closes one-way valve 12 and increases pressure in the upper oil chamber 20, pushing pressure valve 14 downward so that oil in the upper oil chamber 20 may be discharged into the lower oil chamber 24. An oil pressure or a damping force developed at this time varies in value depending on the pressing force of valve spring 15.

Valve spring 15 applies a relatively low pressure $P_1$ to pressure valve 14 to urge the same upward when valve spring 15 is in a position shown in FIG. 2 or when floating cylinder 18 is in a lower position. The oil damper develops a relatively small damping force in this condition.

Oil in the upper oil chamber 20, however, tends to apply pressure, through oil passages 19, 21 and 23, to urge the floating cylinder to move upward. Since floating cylinder 18 has a larger effective pressing area than pressure valve 14, the balance of power between pressure valve 14 and the floating cylinder with valve spring 15 mounted therebetween causes no oil to be discharged through pressure valve 14, so that floating cylinder 18 is urged upward to apply further pressure to valve spring 15.

The upward movement of floating cylinder 18, however, is slowed down by the throttling effect of oil passage 23. If the movement of the piston is at a higher speed, the floating cylinder gradually moves upward while oil in the upper oil chamber 20 is discharged through pressure valve 14. When floating cylinder 18 has moved upward by an amount $l$, valve spring 15 is compressed, so that valve spring 15 applies a higher pressure $P_2$ to pressure valve 14 whereby a larger damping force corresponding to said higher pressure is developed.

If one drives a motor vehicle at a high speed on a relatively good road having little irregularities, an oil damper will be subjected to an upward and downward movement of short period. Since the throttling effect of oil passage 23 deters oil to pass therethrough at high speeds, floating cylinder 18 is disposed in a lower position, so that valve spring 15 applies said lower pressure $P_1$ to pressure valve 14. That is, the oil damper develops a smaller damping force conducive to increased riding comfort.

When the motor vehicle is driven on a bad road, it will sway and jolt violently. This violent swaying and jolting, which is due to the natural vibration of the vehicle, has a relatively long period, so that oil in the upper oil chamber 20 urges floating cylinder 18 to move upward, thereby compressing valve spring 15 which applies said higher pressure $P_2$ to pressure valve 14. Whereupon a large damping force is developed.

Another embodiment of the invention will now be explained with reference to FIG. 3. Oil passage 13 of pressure valve 14 has a substantially limited sectional area. With this arrangement, an increasingly large damping force will be developed in the region of higher piston speeds (above 0.5 m./sec.) or above the piston speed of 600—/min., stroke=15 to 20 m./m., so that the aforementioned object can be accomplished. The damping force will become excessively large, however, in the region of still higher piston speed (1.0 m./sec.). In order to obviate this disadvantage, a relief valve 25 is provided whereby the maximum value of the damping force can be limited. Accordingly, relief valve 25 is arranged such that said relief valve is opened when pressure valve 14 develops an oil pressure slightly higher than the oil pressure it would develop in the region of conventional piston speed (0.3 m./sec.).

FIG. 4 shows diagrams comparing the damping force characteristics of type I (second embodiment shown in FIG. 2) and type II (third embodiment shown in FIG. 3) of the oil dampers according to this invention with the damping force characteristics of an oil damper of prior art, obtained as the result of tests conducted by using a tester to subject the dampers under test to forced vibrations.

It will be noted that the two types of oil dampers according to this invention can develop a large damping force when vibrations of low frequency are to be checked and a small damping force when vibrations of high frequency are to be checked. It will also be noted that the oil damper of type II developes a larger damping force than the oil damper of type I when they operate at a piston speed of 600—/min., storke=20.

An advantage of the second embodiment lies in the fact that the provision of piston means of simple construction adapted to operate in association with a valve spring enables variation of the amplitude of damping force so that damping forces of different values, a large damping force and a small damping force, can be developed. The values of the two damping forces can be predetermined in designing the damper so that the damping forces can readily be controlled. Moreover, the values of damping forces can be varied continuously, not in two stages as is the case with an oil damper of prior art, whereby impacts and noises attendant upon changing the values of damping forces can be eliminated.

If the structural arrangement described hereinabove as being provided in the piston were provided in a bottom cover of the cylinder, the foregoing objects could be accomplished within the spirit of the invention. In this instance, said upper oil chamber and lower oil chamber might as well be referred to as an inside of the cylinder and a cover oil chamber 2, respectively.

It is to be understood that the illustrative embodiments of the invention set forth hereinabove are indicative of but a few of the various types in which the principles of the invention may be used, and that changes may be made therein without departing from the spirit of the invention which is defined in the appended claims.

What is claimed is:

1. An oil damper comprising a fluid pressure cylinder having one end adapted to be connected to one moving part, a piston in fluid tight sliding engagement within the interior of said cylinder, a piston rod extending through the opposite end of said cylinder and through said piston on the interior of said cylinder and adapted to be connected on the exterior of said cylinder to another moving part, a pressing piston secured to the inner end of said piston rod beyond said piston, a floating cylinder disposed around said piston rod between said piston and said pressing piston and engageable around said pressing piston, at least one passage in said piston permitting the passage of fluid from one side of the piston to the other, a valve member disposed adjacent the end of said passage adjacent said pressing piston, spring means disposed between said floating cylinder and said valve member urging said floating cylinder toward said pressing piston and said valve member toward closing engagement over the end of said passage, a passage means defined in said piston rod opening above said piston at one end and between said pressing piston and said floating cylinder at the opposite end and permitting passage of fluid from one side of said piston through said passage means to displace said floating cylinder against said spring means to increase the pressure of said spring means against said valve member and the closing force acting on said valve member when said piston is subjected to an external force tending to move said piston in said cylinder.

2. An oil damper according to claim 1 wherein said passage means includes a portion of relatively small size providing a throttling effect.

3. An oil damper according to claim 1, including at least one additional passage defined in said piston, and a one way valve associated with said additional passage for permitting flow through said passage only in a direction away from said floating cylinder and said pressing piston.

4. An oil damper according to claim 1, wherein said cylinder includes spaced inner and outer walls defining an annular passage around said inner wall and an opening formed in the lower end of said inner wall permitting the fluid flow into the annular passage.

5. An oil damper comprising a fluid pressure cylinder, a piston in fluid tight sliding engagement within the interior of said fluid pressure cylinder, said piston having a passage therethrough with a pressure control valve for closing said passage, a piston rod extending through said piston and having an extending portion below said piston terminating in a widened pressing piston, a floating cylinder disposed around the extending portion of said piston rod and enclosing a portion of said pressing piston to form a chamber therebetween, a flow duct defined in said piston rod communicating with said chamber and the opposite side of said piston, means disposed between said floating cylinder and said control valve for urging said control valve to close said passage, said floating cylinder being movable away from said pressing piston upon flow of fluid through said flow duct upon actuation of a force to said piston in respect to said cylinder to apply increasing closing pressure to said control valve.

6. An oil damper according to claim 5, including a throttle provided in said flow duct terminating in an opening directed against said floating cylinder.

7. An oil damper comprising a fluid pressure cylinder having one end adapted to be connected to one moving part, a piston in fluid tight sliding engagement with the interior of said cylinder, a piston rod extending through the opposite end of said cylinder and adapted to be connected on the exterior of said cylinder to another moving part, a pressing piston secured to the inner end of said piston rod beyond said piston, a floating cylinder disposed around said piston rod between said piston and said pressing piston and engageable around said pressing piston, at least one passage in said piston permitting the passage of fluid from one side of the piston to the other, a valve member disposed adjacent the end of said piston passage adjacent said pressing piston, spring means disposed between said floating cylinder and said valve member urging said floating cylinder toward said pressing piston and said valve member toward closing engagement over the end of said passage, passage means defined in said piston rod opening above said piston at one end and between said pressing piston and said floating cylinder at the opposite end and permitting passage of fluid from one side of said piston through said passage means to displace said floating cylinder against said spring means to increase the pressure of said spring means against said valve member and the closing force acting on said valve member when said piston is subjected to an external force tending to move said piston in said cylinder said passage means including an elongated passage extending through said piston rod and terminating at the lower end of said rod in an opening, a cross passage connecting said elongated passage and terminating in an opening between said floating cylinder and said pressing piston, and valve means located at the opening at the lower end of said elongated passage for permitting escape of fluid through the lower end upon reaching of a predetermined pressure.

8. An oil damper according to claim 7, wherein said valve means comprises a valve and spring means urging said valve to close the opening at the lower end of said elongated passage.

References Cited

UNITED STATES PATENTS 2,244,501 6/1941 Pierce _____ 188—88
3,232,390 7/1966 Chano.

FOREIGN PATENTS 825,969 12/1937 France.

MILTON BUCHLER, *Primary Examiner.*

FERGUS S. MIDDLETON, *Examiner.*

G. E. HALVOSA, *Assistant Examiner.*